United States Patent [19]

Chin et al.

[11] Patent Number: 5,587,583
[45] Date of Patent: Dec. 24, 1996

[54] THERMAL IMAGING DEVICE

[75] Inventors: Richard Chin, Torrance; David Le Fevre, Redondo Beach, both of Calif.

[73] Assignee: Hughes Electronics, Los Angeles, Calif.

[21] Appl. No.: 524,037

[22] Filed: Sep. 6, 1995

[51] Int. Cl.$^6$ .............................. H04N 5/33; H01L 27/16; G02B 26/10; G01J 1/42
[52] U.S. Cl. ........................ 250/332; 250/334; 250/338.1; 250/347; 250/348; 250/349; 250/354.1; 348/164; 348/166; 348/167; 348/168
[58] Field of Search ..................... 250/332, 334, 250/338.1, 347, 348, 349, 354.1; 348/164, 166, 167, 168

[56] References Cited

U.S. PATENT DOCUMENTS

| | | | |
|---|---|---|---|
| 3,804,976 | 4/1974 | Gard | 348/168 |
| 3,895,182 | 7/1975 | Trilling | 348/168 |
| 4,225,883 | 9/1980 | Van Atta et al. | 348/167 |
| 4,276,474 | 6/1981 | Crawford | 250/349 |
| 4,763,192 | 8/1988 | Moore et al. | 348/167 |
| 4,873,442 | 10/1989 | Klatt | 250/334 |

*Primary Examiner*—Constantine Hannaher
*Assistant Examiner*—Virgil Orlando Tyler
*Attorney, Agent, or Firm*—Michael W. Sales; Wanda K. Denson-Low

[57] ABSTRACT

A thermal imaging device (10) has single integrated circuit chip (86) to perform various analog signal processing (ASP) functions. The imaging device (10) has a detector array (50) including a plurality of detectors (50') each of which generate an electrical signal (78) indicative of the infrared flux incident thereon. These electrical signals (78) are processed and provided in the form of serial analog video signals (52) to the ASP chip (86). The ASP chip (86) includes circuitry (200) for correcting for the differing responsivity of serial manufactured detector arrays (50), circuitry (202) for correcting the gain of the serial analog signal (52) globally, and circuitry (206) for sensing the gain of a processing serial analog signal (90) which the ASP chip (86) provides to an analog-to-digital (A/D) converter (92) of the thermal imaging device (10). The ASP chip (86) further includes a buffer (204) for driving the A/D converter (92), and a voltage and current reference generator (212) for providing such references (213) both internally to the ADC IC (86) as well as externally of this IC to other components of the imaging device (10) including the detector (50) and A/D convertor (92). A micro-controller (122) of the thermal imaging device (10) averages the gain of the output signal (90) provided the A/D converter (92) and used this information to calculate responsivity and gain control signals (210, 209) applied to the serial analog video signal (52) provided to the ASP chip (86), such that the A/D converter (92) is provided an analog video signal (90) at a mid-scale level for the input signal to this A/D converter (92).

12 Claims, 4 Drawing Sheets

THERMAL IMAGING DEVICE

BACKGROUND OF THE INVENTION

1. Field of the Invention

The present invention is in the field of imaging devices. More particularly, the present invention relates to devices for receiving invisible infrared light from a scene, and for providing a visible-light image replicating the scene.

2. Related Technology

Night vision devices have been available for many years. One category of these conventional night vision devices uses image intensifier technology. This technology is effected using a device generally known as an image intensifier tube. The image intensifier tube is essentially a frequency-shifting and amplifying device receiving ambient light, which light may include visible light too dim to provide natural vision (i.e., so-called "Star Light" scopes) or invisible near-infrared light in a first frequency band, and responsively providing a greatly intensified visible image in a phosphorescent monochrome yellow-green light.

Such an image intensifier night vision devices convert available low-intensity ambient light to a visible image which a human user of the device may use for surveillance or weapon aiming, for example, under lighting conditions of too dim to allow a scene to be viewed with the natural vision. These image intensifier night vision devices require some residual light, such as moon or star light, in which to operate. This light is generally rich in near-infrared radiation, which is invisible to the human eye. The present generation of night vision scopes use a photoelectrically responsive "window", referred to as a photocathode, which is responsive to the dim or invisible ambient light focused on this "window" from an invisible scene to provide a pattern of photo-electrons flowing as a space charge moving under the influence of an applied electrostatic field, and replicating the scene being viewed. This pattern of photo-electrons is provided to a microchannel plate, which amplifies the electron pattern to a much higher level. To accomplish this amplification at the microchannel plate, the pattern of photo-electrons is introduced into a multitude of small channels (or microchannels) which open onto the opposite surfaces of the plate. By the secondary emission of electrons from the interior surfaces of these channels a shower of electrons in a pattern corresponding to the low-level image is produced. The shower of electrons, at an intensity much above that produced by the photocathode, is then directed onto a phosphorescent screen, again by the application of an electrostatic field. The phosphors of the screen produce an image in visible light which replicates the low-level image.

Image intensifier tubes have evolved from the so-called "Generation I" tubes through the more recent "Generation III" tubes, which provide greater amplification of available light and greater sensitivity to infrared light somewhat deeper into the infrared portion of the spectrum. However, these image intensifier devices are limited with respect to the depth into the infrared portion of the spectrum to which they can operate.

Another category of conventional night vision device is represented by the cryogenically cooled focal plane array thermal imaging devices. These devices use a photoelectrically responsive detector which is cooled to a temperature in the cryogenic range to reduce unwanted thermal noise. The detector includes a plurality of detector elements, or "pixels", each of which provides an electrical signal indicative of the flux of infrared light falling on the detector element. Some such devices use a staring focal plane array; while others have a linear focal plane array of detector elements, and require the use of a scanner to sequentially move portions of the view scene across the detector. In either case, because the detector is cooled to cryogenic temperatures, it can provide an electrical response to invisible infrared light much deeper into the infrared part of the spectrum than is possible with the image intensifier devices. The electrical signal provided by such a detector must be processed and converted to a visible image. For this purpose, many such devices of this category have used cathode ray tubes, liquid crystal displays, and other such display technologies to provide a visible image to the user of the device.

A device of this category is known in accord with U.S. Pat. No. 4,873,442, issued 10 Oct. 1989 to Robert W. Klatt (hereinafter, the '442 patent). The device of the '442 patent uses a sensor with a linear array of elemental detectors each spaced apart from the next-adjacent detector element by a distance about equal to the size of the detector elements themselves along the length of the linear array. Accordingly, the sensor could capture about half of the image information from a scene or object space with each field, or scan of the sensor across the object space. However, in order to detect and compensate for non-uniformity in responsivity of the detector elements, the '442 patent teaches to overlap the scan lines of all of the detector elements in successive scan fields so that each field is missing image information from at least one detector element. That is, no field of the '442 patent uses all of the detector elements to respond to signal (image information) from the scene. At least one detector element at one end of the linear array scans a space outside of the object space and provides no useful image information. According to the example set forth in the '442 patent, each field is missing a fractional part of its maximum possible image information, which fraction is equal to 1/n, where n is the number of detector elements. The remaining n−1 detector elements are used to capture half of the image information from the object space for each field. Klatt shows an example using ten detector elements. Thus, each field presents 90 percent of the image information that it could contain were all detector elements used. Accordingly, each frame of two fields of the '442 patent presents a complete object space image, but represents only 90 percent of the image information which it could provide were all of the detector elements used in each frame. Additionally, the possible number of lines of resolution which the sensor can provide is not fully used by the '442 patent.

A further significant disadvantage of this category of night vision device is the requirement for cryogenic cooling of the detector. Early devices of this category used a Dewar vessel into which a supply of a cryogenic fluid (such a liquid nitrogen) had to be provided by the user of the device. The utility of such devices was severely limited by their requirement for occasional replenishment of the cryogenic coolant. Later devices of this type have used cryogenic cooling developed by reverse Sterling-cycle coolers. However, such coolers require a considerable amount of power, are not without their own maintenance and reliability problems, and are generally noisy.

Additionally, conventional night vision devices of the thermal imaging type have required extensive circuitry to achieve the necessary signal processing required for this type of imaging. That is, conventional devices have required a collection of perhaps as many as ten or eleven different types of circuits formed in integrated circuit (IC) packages on circuit boards in order to achieve the necessary signal processing. Understandably, this requirement for a variety of such circuits on different IC's or circuit boards, resulted in a device which was larger, heavier, consumed more power, was more expensive to manufacture, and more difficult to maintain and repair, than was desired.

SUMMARY OF THE INVENTION

In view of the deficiencies of the conventional technology, a primary object for this invention is to overcome one or more of these deficiencies.

Another object for the present invention is to provide a thermal imaging device having a multi-functional analog signal processing chip which includes circuitry for controlling responsivity and gain of an analog video signal, for sensing the gain of a processed analog video signal, for buffering the processed analog video signal to drive an analog-to-digital convertor, and for generating voltage and current references.

More particularly, an object for the present invention is to provide a thermal imaging device with a single analog signal processing IC performing the above-identified processing functions all on a chip which is smaller, lighter, which consumes less power, and is less expensive to manufacture (when the size and expense of the entire device is considered), than conventional thermal imaging devices.

According to one aspect, the present invention provides a thermal imaging device for receiving thermal infrared radiation from a scene and responsively providing a visible-light image replicating the scene, the thermal imaging device including a detector having an arrayed plurality of infrared detector elements responsive to infrared radiation, each of the plurality of detector elements providing one of a corresponding plurality of individual electrical signals each indicative of the incident thermal infrared radiation incident, a multiplexer circuit receiving the corresponding plurality of individual electrical signals and responsively providing a serial analog image signal, the thermal imaging device including: an analog signal processor (ASP) integrated circuit (IC) for receiving the serial analog image signal and providing a processed serial analog image signal, the ASP IC including: a responsivity control circuit receiving the serial analog image signal and applying a responsivity multiplier to provide a responsivity-corrected serial analog image signal; a gain control circuit receiving the responsivity-corrected serial analog image signal and receiving a gain control signal, and multiplying the responsivity-corrected serial analog image signal with the gain control signal to provide a gain-corrected serial analog image signal.

According to another aspect of the present invention, such an ASP IC of the thermal imaging device further includes a serial-digital interface having digital-to-analog converting circuitry and receiving a digital gain control signal from a micro-controller, such that the serial-digital interface provides an analog gain control signal to the gain control circuitry.

According to still another aspect of the invention, such an ASP IC of the thermal imaging device still further includes voltage buffer circuitry for receiving serial analog signals from the gain control circuitry, such that the buffer circuitry drives the A/D converter.

According to yet another aspect of the invention, such an ASP IC of the thermal imaging device further includes reference circuitry for generating precision voltage references from an external voltage source, with the reference circuitry providing a precision voltage references to at least one circuit located off the ASP IC substrate.

An advantage of the present invention resides in the analog signal processing chip including circuitry for performing the various functions discussed above onto a single integrated circuit chip. By including these circuitry elements on a single integrated circuit chip, the thermal imaging device is, among other things, more efficient, compact, and cost effective than would be the case if either separate dedicated circuit chips or hard-wired discreet-component circuits were used to perform the various functions.

These and additional objects and advantages of the present invention will be appreciated from a reading of the following detailed description of at least one preferred exemplary embodiment of the invention, taken in conjunction with the appended drawing Figures, in which the same reference numeral indicates the same feature, or features which are analogous in structure or function to one another.

DESCRIPTION OF THE DRAWING FIGURES

FIG. 1 provides a diagrammatic representation of the functionally cooperating physical components of a thermal imaging device embodying the invention;

FIG. 2 is a schematic block diagram of a thermal imaging device according to the present invention;

FIGS. 3a and 3b respectively provide an external view and an exploded perspective view of a thermal imaging device embodying the invention; and FIG. 4 a schematic block diagram of a multi-functional signal processor chip utilized in an embodiment of the invention described herein.

DETAILED DESCRIPTION OF AN EXEMPLARY PREFERRED EMBODIMENT OF THE INVENTION

An Overview

Figure 1:
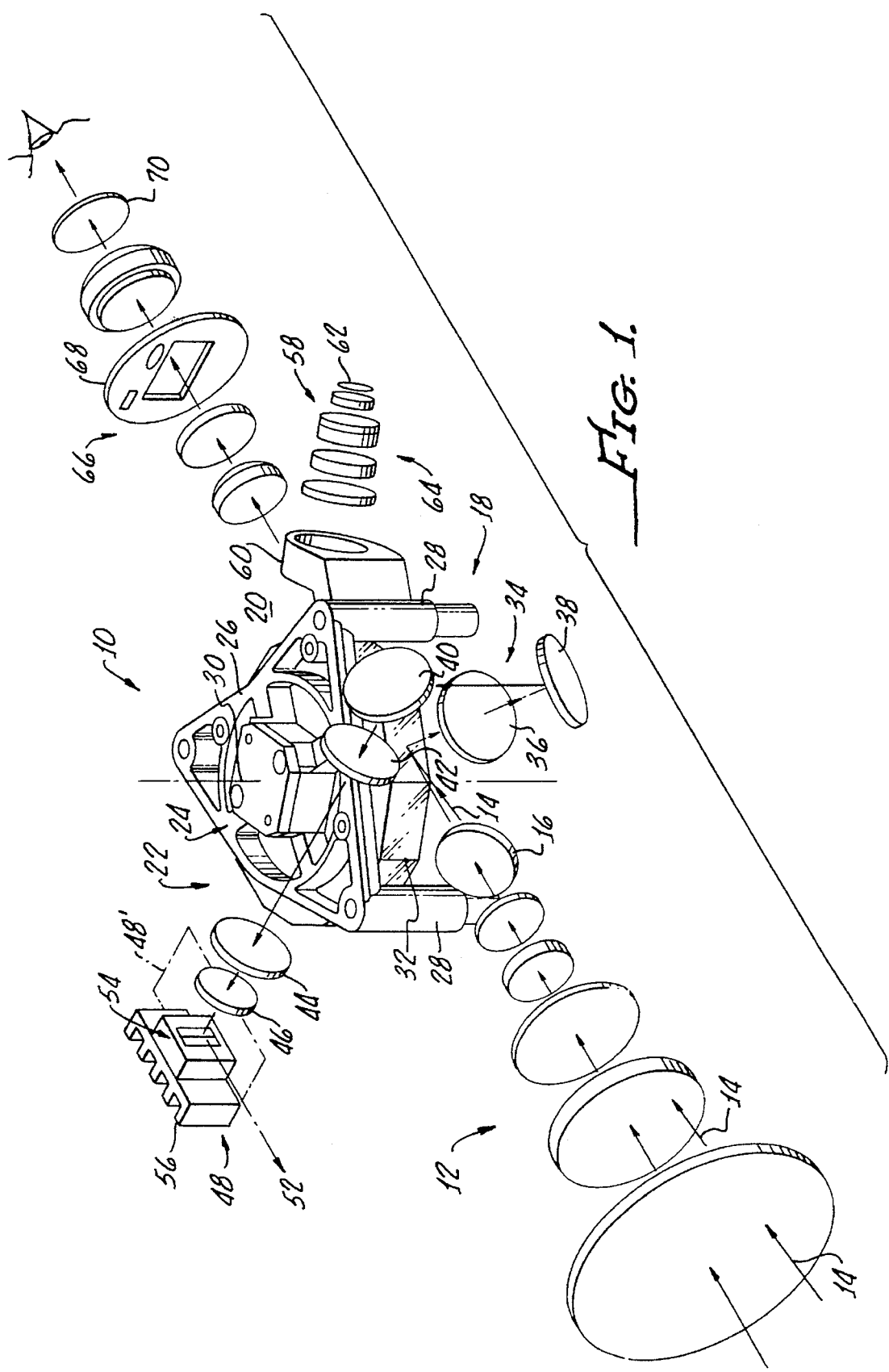

Viewing FIG. 1, a thermal imaging device 10 is diagrammatically depicted with its functionally cooperative physical components suspended in space without the depiction of a supporting housing (which housing is, of course, included by a physical embodiment of the device), so that these components and a ray-tracing diagram for light rays in the device can also be presented. Viewing FIG. 1 in detail, the thermal imaging device includes an objective optics group, generally indicated with the numeral 12. This objective optics group includes several lenses (indicated with reference numerals 12', 12", 12''', etc.), which lenses are transparent to light in the spectral band of interest (but not necessarily transparent to visible light). The objective optics group 12 is pointed toward a scene to be viewed, so that infrared light from this scene (indicated with the arrowed numeral 14) can be received and focused by this optics group. It will be understood that the objective optics group 12 seen in FIG. 1 is representative only, and that this optics group may be removed and replaced with objective optics of differing configurations, as will be further described. The objective optics group 12 concentrates and columnates received light through a window 16, which window is a permanent part of a basic sensor portion 18 of the device 10. In conjunction with the housing (to be described below) of this basic sensor portion 18, this window 16 bounds a sealed chamber 20 in which are received almost all of the remaining components of the device 10 as illustrated in FIG. 1.

Within the housing chamber 20 is received a scanner, generally referenced with the numeral 22. This scanner 22 includes a scanner frame 24, which is generally of triangular or tripod configuration in plan view. The scanner frame 24 includes a generally triangular upper wall portion 26, and three depending leg portions 28, only two of which are visible in FIG. 1. Carried by the wall portion 26 is a scanner motor, generally indicated with the numeral 30. This scanner motor 30 includes a generally vertically extending rotational drive shaft (not visible in the drawing Figures) drivingly carrying a disk-like circular multi-faceted scanning mirror 32. The scanning mirror 32 includes plural outwardly and circumferentially disposed adjacent facets or faces 32a, 32b, etc. only a few facets of which are seen in any one of the drawing Figures. This scanning mirror 32 rotates in a generally horizontal plane to reflect light 14 received via the window 16 and objective optics group 12 to an image optics group, generally indicated with the numeral 34. It will be noted that because of rotation of the scanning mirror 32, the facets 32a, 32b, etc., continually change their angulation in the horizontal plane with respect to the scene viewed via the objective optics group 12.

Considering the image optics group 34 in greater detail, it is seen that light (arrow 14) reflected from a facet of the scanning mirror 32 passes through a lens 36 and to a pair of vertically spaced angulated mirrors 38, and 40. The mirror 40 reflects this light through an additional pair of lenses 42, and 44 toward a window 46 carried by a Dewar vessel 48. The Dewar vessel 48 includes a thermally insulative housing, generally indicated with the dashed line and the reference numeral 48'. This Dewar vessel 48 houses a linear focal plane infrared detector 50 having a linearly-arrayed multitude of small infrared detector elements, indicated collectively on FIG. 1 with the vertical line 50' on detector 50. Each of the detector elements 50' of the detector 50 provides a corresponding one of a like multitude of electrical signals each of which is indicative of the flux level of infrared light falling on the particular detector element. These electrical signals are provided outwardly of the Dewar vessel 48 by an electrical interface (to be further described), and indicated on FIG. 1 with the dashed line 52.

In order to cool the detector 50 to a sufficiently low temperature that thermally excited electrons (as opposed to electrons excited by photons of infrared light falling on the detector 50) do not cause an undesirably high level of electrical noise which would hide the desired photoelectric image signal, the Dewar vessel 48 includes a multi-stage reversed Peltier-effect (i.e., thermoelectric) cooler 54. The thermoelectric cooler 54 has a chilling face to which the detector 50 is mounted to be cooled, and a heating face in heat transfer relationship with a heat sink schematically indicated with the numeral 56. In the physical embodiment of the imaging device 10, the heat sink 56 is defined by a metallic portion of the housing for the device 10 as will be seen. It will be understood that because of the continuous change in angulation of each facet 32a, 32b, etc., of the scanning mirror 32 as this mirror rotates in a horizontal plane, the scene reflected from each particular facet sweeps horizontally across the linear array of detector elements 50' (i.e., perpendicularly to the vertical linear array of these detector elements). The detector elements 50' responsively provide electrical signals (via interface 52) which are indicative of the flux levels of infrared light falling on corresponding ones of the plural detector elements 50' from a particular part of the scene during any one sweep of a scene portion across the detector 50.

In order to provide a visible image to be viewed by a user of the imaging device 10, a light emitting diode (LED) projection array module 58 is carried by an apertured flange portion 60 of the scanner frame 26. This LED projection array module 58 includes a linear LED array 62, which array includes a multitude of individual LED's (not visible in FIG. 1, but indicated with the arrowed numeral 62'), each individually emitting visible light when energized. The LED's 62' of the array 62 are arrayed linearly along a vertical line similarly to the linear arrangement of the detector elements 50' of the detector 50. The LED's 62' provide respective portions of a visible image, as will become apparent. Light from the LED's 62' is columnated and projected by a projection lens group, generally indicated with the numeral 64, onto a facet of the mirror 32, and as indicated by the arrowed reference numerals 14'. The numerals 14 and 14' are used intentionally with respect to the invisible infrared light carrying image information from a scene, and the visible light replicating the scene for viewing by a user of the device 10.

From the mirror 32 (i.e., from a particular facet 32' of this mirror) the visible light from the LED's 62' is reflected to an ocular lens group, generally indicated with the numeral 66. The ocular lens group 66 includes several individual lenses, indicated with the respective reference numerals 66', 66'', etc. Along with these lenses 66', 66'', etc., a status display unit 68 is interposed in the ocular lens group 66. This status display unit 68 defines an aperture through which the visible image is perceived, and includes several individual LED's which when illuminating are peripherally visible to the user of the device 10. These individual LED's are indicated with the numerals 68', 68'', etc. Finally, the imaging device 10 includes a pair of eyepiece shutters 70. These shutters 70 are biased closed to prevent light emanations from the device 10 when a user's face is not pressed against a movable eyepiece member (to be described below). When the user presses against the movable eyepiece member, the shutters 70 open to allow the user to view the visible light image provided by the LED projection display module and the spinning mirror 32.

Figure 2:
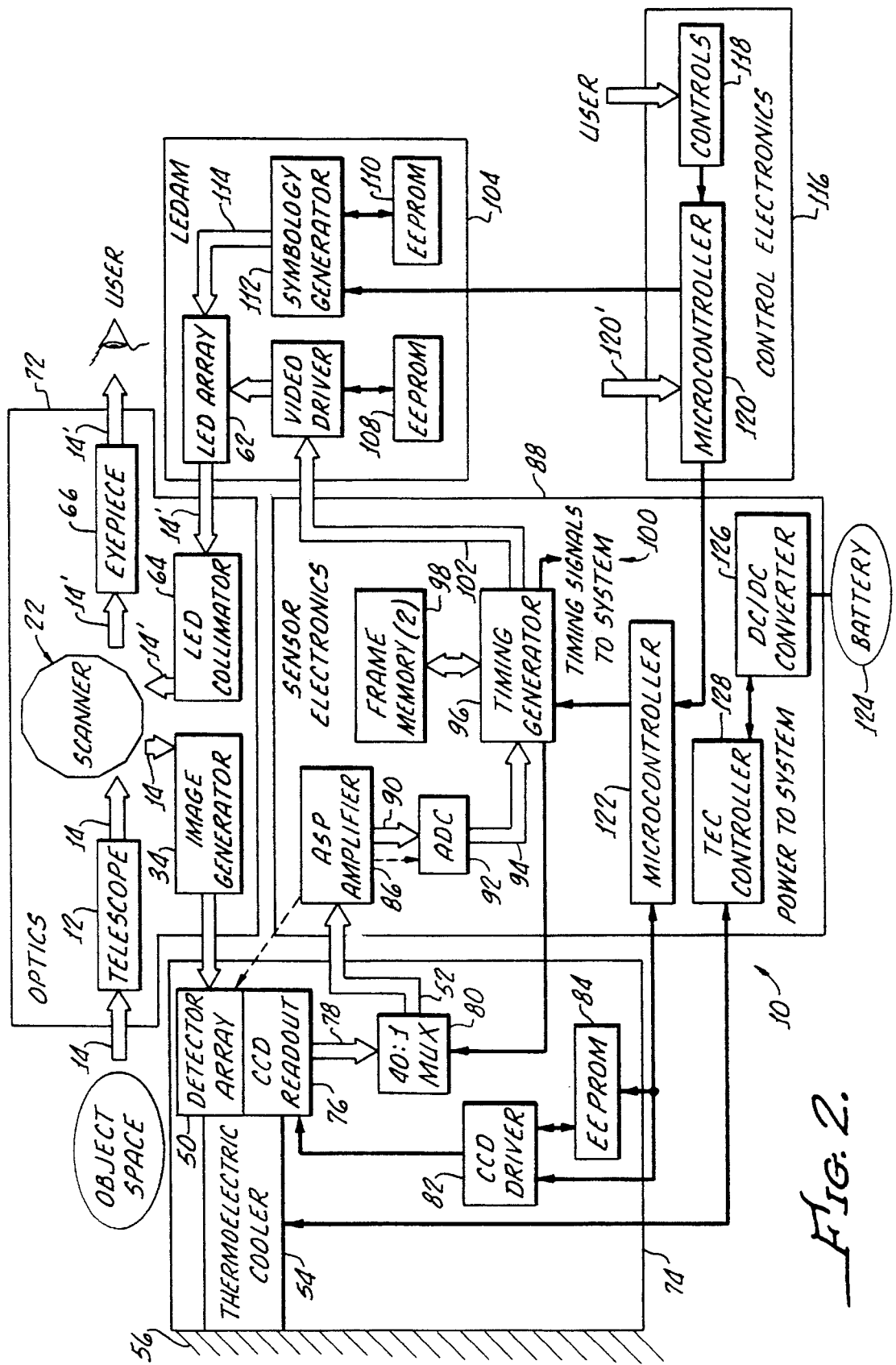

Viewing now FIG. 2, a schematic functional block diagram of the thermal imaging device 10 is presented. This thermal image device 10 is divided into functionally modular portions, as is indicated by the dashed-line boxes encircling the various components of the device, with some of the modules including several sub-modules or components. The module 72 manages both invisible and visible light, and includes the objective optics group 12 receiving the invisible infrared light 14 from a scene to be viewed, the scanner 22, and image optics group 34 directing this invisible light to the detector 50. This light management module 72 also receives visible light from the LED array 62, and includes the projection lens group 64 projecting this light to the scanner 22, and ocular lens group 66 providing the image to a user of the device.

Detection module 74 is enclosed within the Dewar vessel 48, and receives the focused invisible infrared light 14 from the scene to be viewed. This module 74 includes the detector 50, along with a readout circuit 76 providing multiple channels of electrical image signal 78 (one channel for each detector element of the linear detector array 50, recalling the description above) to a multiplexer circuit (MUX) 80. The MUX 80 provides the electrical interface output 52 in the form of a serial analog image signal. Detector module 74 also includes a driver circuit 82 providing control commands to the readout circuit 76. An electrically erasable programmable read-only memory (EEPROM) 84 is included in the detection module 74 to locally store and provide data on the operation of the readout circuit 76, providing compensation factors locally for a number of gain-control and non-uniformity compensations in connection with the infrared detector 50. As can be seen from FIG. 2, the various circuits of the module 74 have electrical interface with other modules of the device 10.

The serial analog image signals 52 provided by module 74 are received by an analog signal processor (ASP) 86 which is located in a process-and-control (P&C) module 88. A processed serial analog image signal 90 is provided by the ASP 86 to a analog-to-digital converter (ADC) 92. A resulting processed serial digital image signal 94 is provided to a timing generator 96. This timing generator 96 has an interface with the multiplexer circuit 80 to control the timing of operation of this circuit. A frame memory 98 is interfaced with the timing generator so that image information which is global to the scene being viewed may be stored and retrieved for use in providing gain adjustment, contrast, and other compensation factors for use in processing the image signals obtained from the detection module 74. Timing generator 96 also provides a system-wide timing control signal, indicated with the reference numeral 100. This timing control signal is used to operate several other features of the imaging device 10, including control of the rotational speed and position of the mirror 32 so as to achieve time-correlation of the operation of the detector 50, mirror 32, and LED array 62.

A serial digital image signal 102, compensated and time-correlated, is provided by the timing generator 96 to a display module 104. This display module 104 includes the LED projection array module 58, along with a driver circuit 106 for receiving the signal 102 and driving the individual LED's 62' in response to this signal. An electrically erasable programmable read-only memory (EEPROM) 108 has an interface with the driver circuit 106 for receiving and storing for future use values to be used in the operation of the device 10. For example, EEPROM 108 may be used to store stadia line spacing information, which would allow the device 10 to be used to estimate ranges to personnel or vehicles of known sizes. In order to provide a user of the imaging device 10 with additional useful image information, such as spaced-apart comparative-size lines for humans and various types of vehicles so that ranges can be estimated, or with a reticle of various kinds and sizes in accord with the range to an object being viewed and the use being made of the device 10 at a particular time, the display module 102 also includes another electrically erasable programmable read-only memory (EEPROM) 110 for storing such image information. This image information, as selected by the user of the device 10, is provided to a symbology generator circuit 112, which in turn provides a symbology signal 114 to the LED array 62. The array 62 includes separate light emitting diodes (LED's) for receiving the signal 114.

In order to complete this description of the imaging device 10 as illustrated in FIG. 2, it should be noted that the device 10 includes an input-output (I/O) module 116. This I/O module 116 allows a user of the device 10 to input commands via a set of externally-accessible controls 118, such as a set of momentary contact push button switches which may be operated from outside the housing of the device 10. The controls 118 have an interface with a microprocessor 118, which is part of a distributed control system also including another microprocessor 122 in the P&C module 88. The microprocessors 120 and 122 have an interface with the EEPROM's 84, 108 and 110, along with the circuits served by the data and commands stored in these EEPROM's. The microprocessor 120 has an externally-accessible data interface port 120' so that all of the data and programming stored in the microprocessors 120, 122, and the EEPROM's interfaced with these microprocessors, and the circuits served, may be inserted and changed by access to the port 120'. Finally, it is seen that the P&C module 88 provides power input to the system from a power source, such as from a battery pack 124. A DC/DC power converter 126 provides power to various modules and components of the device 10 at appropriate voltage and current levels. One of the circuits powered from converter 126 is a controller 128 for the thermoelectric cooler 54.

Figure 3:
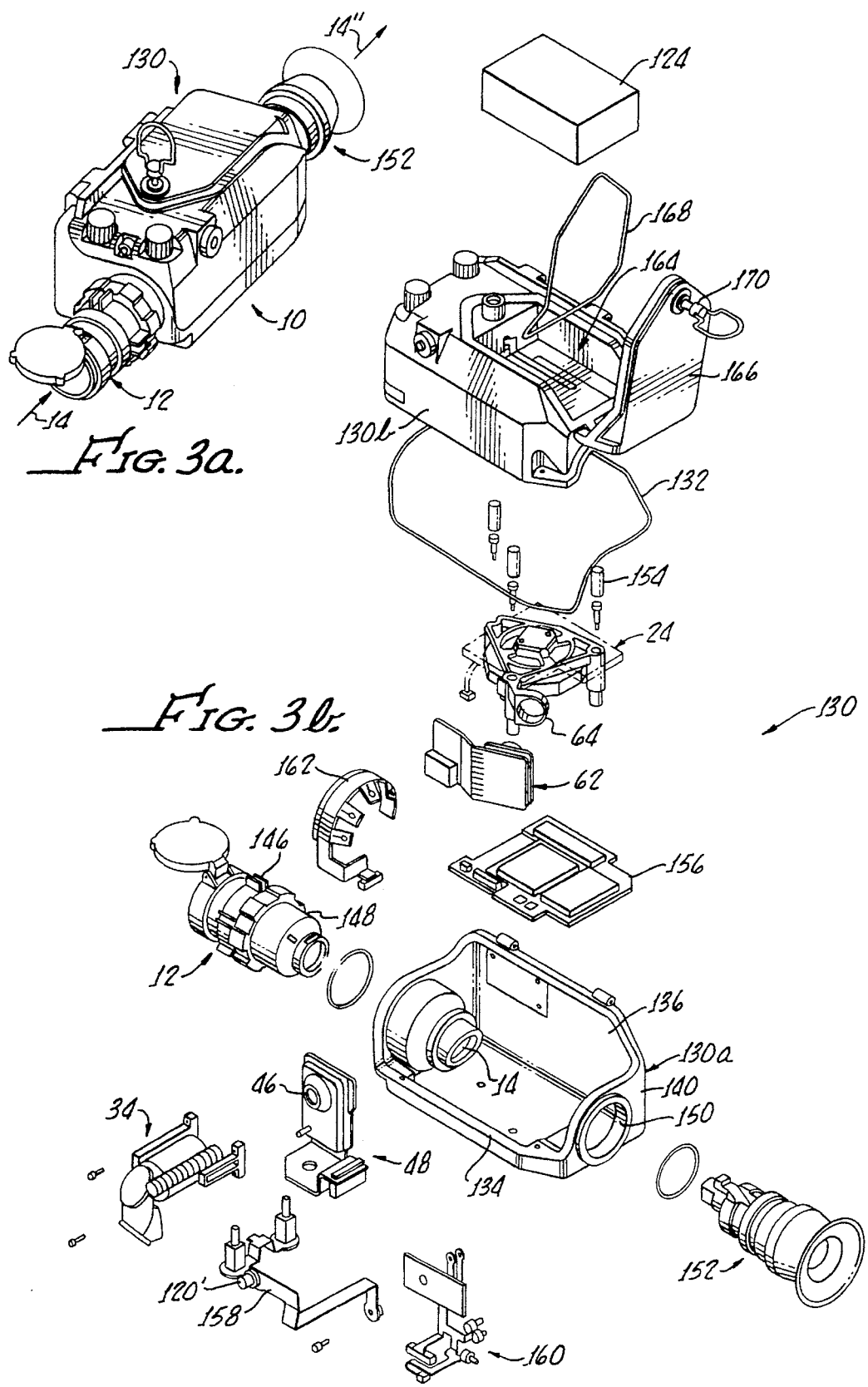

Turning now to FIGS. 3a and 3b, a physical embodiment of the imaging device 10 is presented in external view and in exploded perspective view, respectively. The imaging device 10 includes a two-piece chambered housing 130. This housing includes two pieces 130a and 130b which sealingly cooperate (via an intervening sealing member 132) to bound the chamber 20 within this housing. The part 130a of the housing 130 is fabricated of cast non-magnetic metal (of aluminum, for example), is somewhat L-shaped in transverse cross section, and provides a lower wall portion 134, a side wall portion 136, and an apertured pair of opposite front (138), and rear (140) wall portions. This housing part 130a provides a heat sink for the thermoelectric cooler 54, and a base (i.e., in effect, an optical bench) to which the optical and other components of the device 10 are mounted, as will be seen.

The front wall portion 138 of housing part 130a defines a re-entrant portion 142 which forwardly defines a somewhat conical recess (not visible in the drawing Figures), and which at its aft end carries the window 16 in the aperture 144 of this wall. The objective optics group 12 is carried at this front wall 138 by a housing 146 which at its aft end defines a conical portion 148 for receipt into the front recess of the housing part 130a. The housing 146 is removably engageable with the housing part 130 to connect the objective optics group 12 in its proper location, and is also removable so that optics of different power may be fitted to the sensor portion 18. At the aperture 150 of the rear wall portion 140, the ocular lens group 66 is sealingly carried in a housing portion 152.

Within the chamber 20 of the housing 130, the scanner 24 is secured to the lower wall 134 by a trio of screws 154 which each pass through a respective vertically extending hole defined centrally of a corresponding one of the three legs 28 of the scanner frame 24. These screws threadably engage respective bores defined by the lower wall 134. Captured between the lower ends of the legs of the scanner frame 24 and the lower wall 134 of the housing 130 is an electronics assembly 156. This electronics assembly 156 includes a circuit board and many of the discreet and integrated circuit devices including micro-controller 122, which are necessary in order to effect the functions explained with respect to FIGS. 1 and 2. Also mounted to the lower housing part 130a, in addition to the already identified components and modules, which are indicated on FIG. 3b with their previously-introduced reference numerals, is an electronic cable assembly 158. This cable carries externally-accessible data interface port 120', the connector for which extends sealingly through a hole provided in the housing portion 130b, as is seen in this drawing Figure.

A Control electronics module 160 with its own cable assembly also mounts in the housing 130 and provides the control input momentary-contact switches 118 and micro-controller 120 identified with respect to FIG. 2. Finally, received in the housing 130 and circumscribing the re-entrant portion 142 of the front wall 138 is a magnetic reed switch and cable assembly 162. This cable assembly with its several magnetically-responsive reed switches is responsive to one or more magnets carried in respective locations by various ones of the objective optics groups which can be used with the basic sensor 18. These magnets are located in particular locations (i.e., in a position code) on each objective lens set in order to provide a user both with differing levels of magnification of a distant scene, and differing symbology appropriate for the particular use for which the objective lens set adapts the sensor 18. When the basic sensor responds to the installation of a particular lens group, the user is provided with symbology and other internal adjustments of the operation of the sensor 18 automatically. The reed switches are able to sense the particular locations of the magnets on the lens groups (thus identifying the particular lens group) through the non-magnetic front wall portion 138 of the housing 130. Thus, no physical input is necessary from an operator to identify a particular lens group to the sensor 18, and the chamber 20 remains sealed.

Figure 4:
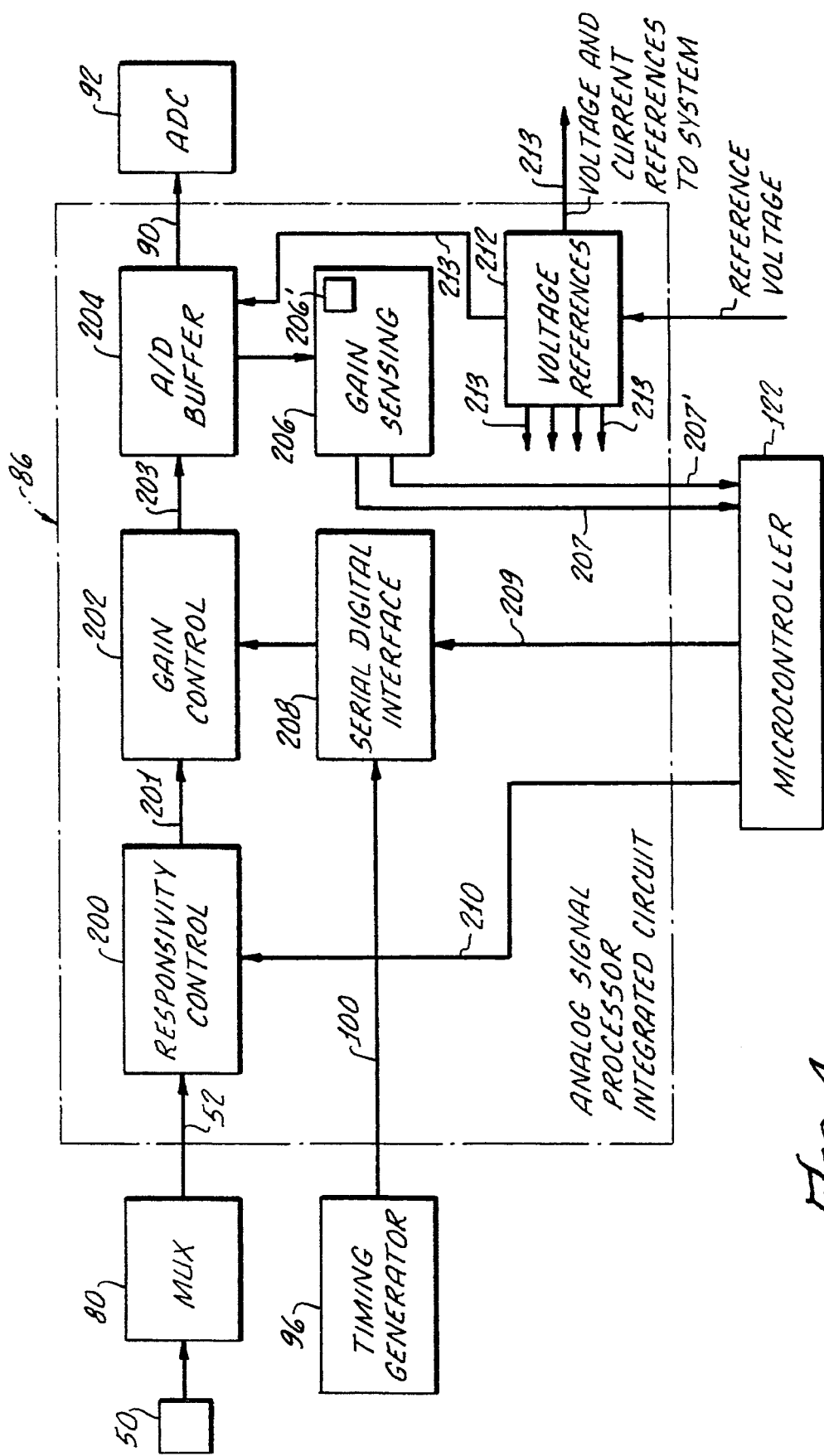

Viewing now the housing portion 130b, it is seen that this housing portion defines a battery compartment recess 164 at an aft portion of the housing 130. This recess opens both upwardly and rearwardly on the housing part 130b. Battery 124 is received into the recess 164, and is covered sealingly in this recess by a hinged door member 166 with an intervening sealing member 168. The door 166 is somewhat L-shaped in side view, and is hinged adjacent to its rear edge to the housing part 130b. A latching device 170 is carried by the door 166 adjacent to its forward end, and is removably engageable with a recess feature of this housing part to retain the door 166 in its closed position, as is seen in FIG. 3a Multi-functional Analog Signal Processor Chip Turning now to FIG. 4, the ASP 86 is represented by a block diagram representative of the circuit sections and functions found on the single semiconductor substrate of the ASP IC 86. The boundary of this substrate is indicated with the arrowed numeral 86, so that the numeral 86 in FIG. 4 serves to indicate both the IC and its substrate. The ASP 86 is configured as a single integrated circuit (IC), which receives the serial analog image input signals 52 from the MUX 80 of module 74 and provides the processed serial analog image signals 90 to the ADC 92. Generally, the ASP IC 86 includes circuitry for compensating the serial analog image signal 52 for varying electrical responses of the various detectors 50 (i.e., providing a responsivity-corrected signal), circuitry applying a global gain factor to the responsivity-corrected serial analog signal (i.e., providing a gain-corrected signal), and circuitry for buffering the gain-corrected image signal with reference to a voltage reference to provide the signal 90 to the ADC 92. As a result, the ADC 92 receives the processed serial analog video signals 90 on average at the mid-point or mid-scale level for an input signal to this. ADC 92. Additionally, the ASP IC 86 includes a voltage reference source, providing reference voltage levels used both within the ASP IC 86, and also used off of this chip in other parts of the device 10. The ASP IC 86 also includes a serial digital interface, which will be more completely described below along with a description of the voltage reference source.

More particularly, the responsivity control 200 of the ASP IC 86 is used to compensate for the varying levels of analog signal obtained as the signal 52 for various detectors 50 when these detectors are viewing a standard thermal source. This is a calibration compensation. In other words, in any group of the individual detectors 50 (considered globally, not at the level of individual detector elements 50'), these detectors will vary slightly from one another in terms of their response to infrared radiation. When various ones of the detectors 50 view a standard thermal source, a differing and individual signal level will be obtained from each detector 50. In order to compensate for this difference in individual detectors 50, each detector as part of its manufacturing process is tested viewing a standard thermal source. The response of the detector is noted and a calibration factor is calculated. This calibration factor is stored in PROM memory within the device 10 (i.e., in EEPROM 108 or 110, for example recalling FIG. 2) so that the calibration factor can be applied as a compensation or scaling factor to the output of the particular detector 50. The microprocessor 122 obtains this calibration factor and applies a command via connection 210 to the responsivity control 200. As a result, the serial analog video signals 52 are all scaled by the responsivity control 200 according to the calibration factor for the particular detector 50 in the device 10 so that substantially a standardized signal level is obtained (i.e., the responsivity-corrected signal, indicated with arrow 201) for a particular level of thermal brightness of a viewed scene from each of the devices 10.

Next, a gain compensation is applied by gain control 202. That is, a global gain factor is applied to all of the responsivity-corrected serial analog video signal (signal 201) in order to provide a gain-compensated serial analog video signal (signal 203). As was generally explained above, the gain compensation factor is provided by connection 209 from microprocessor 122 to the gain compensation control 202 via an intervening serial digital interface 208. This interface has a connection with the timing generator 96 so that the gain factor, which is continuously updated by the micro-processor 122 in view of the thermal content of the scene being viewed, is changed from frame to frame rather than within frames. This gain compensation control 202 is essentially a variable-gain analog amplifier applying a gain factor (according to the command received via connection 209 and interface 208 from microprocessor 122) to the responsivity-corrected serial analog video signal 201. Thus, a gain-corrected serial analog video signal is provided, as is indicated by arrow 203.

An analog-to-digital (A/D) buffer 204 receives the gain-corrected signals 203 from the gain control circuit 202 and references this analog signal to a voltage reference provided by reference-voltage circuitry 212. This reference-voltage circuit 212 generates an internal current reference and voltages references, represented by output interfaces 213. Reference-voltage circuitry 212 uses an external precision reference represented on FIG. 4 with arrow 126'. For example, this external voltage reference may be provided by the power supply DC/DC converter 126 and the battery 124 of FIG. 2. Preferably, this external reference is approximately five volts. More specifically, the reference-voltage circuitry 212 of the ASP IC 86 generates three precision voltage references for use by the detector assembly 50 (as shown in FIG. 2 by the dashed-line interconnection) and the A/D converter 92 (also shown by dashed-line interconnection), and further generates a precision current reference for use by the detector assembly 50. These external uses of the reference voltages and current levels provided by the reference-voltage generator 212 are represented on FIG. 4 by the single arrow 213 exiting the ASP IC 86. For example, a precision voltage reference is required for the resistor ladder of the A/D converter 92.

Also, as is represented by the connection 213 between reference-voltage source 212 and the buffer 204, this reference-voltage source 212 also provides reference voltage levels for use within the ASP IC 86. Other of these various internal (to ASP IC 86) uses of references provided by the reference-voltage source 212 are generally indicated by the plural arrows 213 leaving source 212 within the ASP IC 86. Also within ASP IC 86 is a gain sensing circuit 206 coupled to the A/D buffer 204 for sensing the levels of the output signals 90 and for generating gain-control outputs 207, 207' including a digital output and an analog output. These outputs 207 are transmitted to the micro-controller 122 of module 88, and will be further discussed below.

By fabricating a single multi-function integrated circuit chip, the requirements for dedicated external circuitry and for circuitry interconnections is minimized. Thus, this single ASP IC reduces the overall size of the required circuitry, and the number of required parts for the thermal imaging device 10; which in turn results in a lower-cost to manufacture and assemble the thermal imaging device 10, as well as improved packaging efficiency and durability for this thermal imaging device.

The serial analog video signals 52 are transmitted to the ASP IC 86 at a nominal pixel rate generated by the timing generator, preferably approximately five megahertz. Generally speaking, each line of the serial analog signals 52 comprises 512 pixels which represent the output of one detector element 50' from a scan of the object space across this detector element. Because there are 40 detector elements, each field (from a single scan of the object space) includes 40 such lines of image data. By interlacing the fields, each of 40 lines of image data, an image frame of 160 lines (by 512 pixels per line) of image information is provided. As the timing generator 96 provides the pixels of the input signal 52 to the ASP IC 86, the responsivity control circuitry 200 corrects for the responsivity of the detector 50. The gain sensing block 206 measures the signal amplitude out of the A/D buffer block (i.e., signal 90). Signal amplitude is defined in this instance as the absolute value of the difference between the signal 90 and the mid-scale value for a signal into the analog-to-digital buffer 204. The gain sensing block 206 is gated so that only a portion (usually the middle part of the image) of an image frame of data is used. The gain sensing block 206 has two outputs, a digital count of median-amplitude pixels (median value signal 207), and an analog low-pass of the signal amplitude (signal 207'). This signal 207' is an average value signal. The microcontroller 122 receives these two signals 207 and 207', and responsively returns the global gain control signal 209 to the ASP IC 86.

As a result, the voltage level of the output analog signal 90 is equal to the product of the voltage of the input signal 52, the responsivity gain control, and the global gain control, such that the transfer function is:

$$V_{out} = K_{RC} * K_{GAIN} * V_{in}$$

where:

$K_{RC}$ is the responsivity gain control $K_{GAIN}$ is the global gain control $V_{in}$ is the input signal As mentioned above, a preferred criterium is that the signal 90 provided by the buffer 204 to the A/D converter 92 is on average to be at the mid-scale level for an input signal to the converter 92. The global gain calculation described above has the effect of using the average and median values of the viewed scene as a thermal reference for the thermal imaging device 10. The device 10 automatically adjusts for the various temperatures of objects in the viewed scenes so that the signal amplitude to the A/D converter 92 on average is maintained in a selected range. Further, a hot object in the viewed scene will not result in the gain being decreased to a level causing the scene to go dark except for the hot object because the gain control also considers the median value of the image information being received from the detector 50. As a result, no adjustment of the device 10 is necessary when the device 10 is used to view a scene in a relatively cool ambient environment, for example, on the ocean, or for a scene in a relatively warm ambient environment, for example, in a forest after a hot day. Also, if the device is used to view a scene having a localized highly emissive source, such as a fire, the gain control will still keep the relatively cool portions of the scene visible instead of darkened to obscurity.

In sum, the thermal imaging device 10 is, among other things, more compact, efficient, and cost effective as the ASP IC chip 86 incorporates multiple functions onto a single IC chip, including responsivity control, global gain control, gain sensing, output signal buffering, and reference generating.

While the present invention has been depicted and described and is defined by reference to a particularly preferred exemplary embodiment of the invention, such reference does not imply a limitation on the invention, and no such limitation is to be inferred. The invention is capable of considerable modification, alteration, and equivalents in form and function, as will occur to those ordinarily skilled in the pertinent arts. The depicted and described preferred embodiment of the invention is exemplary only and is not exhaustive of the scope of the invention. Consequently, the invention is intended to be limited only by the spirit and scope of the appended claims, giving full cognizance to equivalents in all respects.

We claim:

1. A thermal imaging device for receiving thermal infrared radiation from a scene and responsively providing a visible-light image replicating the scene, said thermal imaging device including a detector having an arrayed plurality of infrared detector elements responsive to infrared radiation, each of said plurality of detector elements providing one of a corresponding plurality of individual electrical signals each indicative of the thermal infrared radiation incident thereon, a multiplexer circuit receiving said corresponding plurality of individual electrical signals and responsively providing a serial analog image signal, said thermal imaging device comprising:

an analog signal processor (ASP) integrated circuit (IC) for receiving said serial analog image signal and providing a processed serial analog image signal, said ASP IC including:

a global responsivity control circuit receiving said serial analog image signal and applying a constant global responsivity multiplier which is individual to said detector and which has been calibrated by reference to an external standard thermal source to provide a responsivity-corrected serial analog image signal;

a gain control circuit receiving said responsivity-corrected serial analog image signal and receiving a gain control signal, and multiplying said responsivity-corrected serial analog image signal with said gain control signal to provide a gain-corrected serial analog image signal.

2. The thermal imaging device of claim 1 wherein said ASP IC further includes a gain sensing circuit for providing an average value of said gain-corrected serial analog signal.

3. The thermal imaging device of claim 2 wherein said ASP IC further includes a micro-controller for receiving said average value of said gain-corrected serial analog signal and responsively providing a gain control signal to said gain control circuit.

4. The thermal imaging device of claim 3 wherein said ASP IC further includes a serial digital interface having digital-to-analog converting circuitry and receiving said gain control signal in digital format from said micro-controller, said serial digital interface providing a corresponding analog gain control signal to said gain control circuit.

5. The thermal imaging device of claim 1 wherein said ASP IC further includes a buffer circuit for receiving said gain-corrected serial analog signal from said gain control circuit, said buffer circuit providing a voltage-referenced serial analog output image signal.

6. The thermal imaging device of claim 1 wherein said ASP IC further includes a reference-voltage circuit for generating precision voltage references, said reference-voltage circuit including provision for connection to an external voltage source, and said reference-voltage circuit providing said precision voltage references to a buffer circuit.

7. The thermal imaging device of claim 6 wherein said reference-voltage circuit provides said precision voltage references to said detector.

8. The thermal imaging device of claim 6 wherein said reference-voltage circuit further includes circuit elements for generating precision current references.

9. A thermal imaging device for providing a visible-light image replicating a viewed scene, said thermal imaging device including a detector array having a plurality of infrared detector elements responsive to infrared radiation, each of said plurality of detector elements providing a corresponding individual electrical signal indicative of the thermal infrared radiation incident thereon, multiplexing circuitry for receiving said electrical signals and providing a serial analog signal corresponding to said electrical signals and comprising a plurality of pixel values, a micro-controller for generating digital control signals, an analog-to-digital (A/D) converter for providing serial digital image signals, and a timing generator for providing timing signals to at least said micro-controller, said thermal imaging device comprising:

an analog signal processor (ASP) integrated circuit (IC) chip having a singular semiconductor substrate, said ASP IC receiving said serial analog signals from said multiplexing circuitry and providing processed serial analog signals to said A/D convertor, said ASP IC including:

responsivity control circuitry receiving said serial analog signals for globally correcting responsivity of each of said plurality of pixels of serial analog signals with respect to a constant global correction factor individual to said detector array and referenced to an external standard thermal source, said responsivity control circuitry including digital-to-analog converting circuitry for receiving a constant digital responsivity control signal from said micro-controller, said responsivity control circuitry multiplying said serial analog signals by said responsivity control signal;

gain control circuitry receiving said serial analog signals from said responsivity control circuitry for correcting the gain of said serial analog signals;

a serial digital interface including digital-to-analog converting circuitry for receiving a digital gain control signal from said micro-controller and a timing signal from said timing generator, said interface providing said gain control circuitry with said gain control signal, said gain control circuitry multiplying said serial analog signals by said gain control signal; and gain sensing circuitry for sensing the gain of said processed serial analog signals, said gain sensing circuitry generating gain sensing outputs representing the magnitude of said processed serial analog signals, said gain sensing circuitry providing sensed-gain outputs to said micro-controller, said micro-controller generating said control signals based upon said sensed-gain outputs.

10. The thermal imaging device of claim 9 wherein said ASP IC chip further includes voltage buffer circuitry receiving said serial analog signals from said gain control circuitry.

11. The thermal imaging device of claim 10 wherein said ASP IC chip further includes reference circuitry for generating precision voltage and current references referenced to an external voltage source.

12. The thermal imaging device of claim 11 wherein said reference circuitry provides said detector array with a voltage reference and a current reference.

* * * * *